United States Patent
Hershberg

(10) Patent No.: US 9,609,062 B2
(45) Date of Patent: Mar. 28, 2017

(54) SEMANTIC MAPPINGS FROM HUMAN READABLE MESSAGES TO PROGRAMMATIC INTERFACES

(71) Applicant: QUALCOMM Incorporated, San Diego, CA (US)

(72) Inventor: Joshua Dickenson Hershberg, Beit Shemesh (IL)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 14/315,144

(22) Filed: Jun. 25, 2014

(65) Prior Publication Data

US 2015/0006696 A1    Jan. 1, 2015

Related U.S. Application Data

(60) Provisional application No. 61/839,822, filed on Jun. 26, 2013.

(51) Int. Cl.
*H04L 29/08* (2006.01)
*G06F 9/44* (2006.01)

(52) U.S. Cl.
CPC .......... *H04L 67/12* (2013.01); *G06F 9/4443* (2013.01); *H04L 67/10* (2013.01)

(58) Field of Classification Search
CPC ........ H04L 67/10; H04L 67/12; G06F 9/4443
See application file for complete search history.

(56) References Cited

U.S. PATENT DOCUMENTS

| | | | | |
|---|---|---|---|---|
| 6,112,235 A | * | 8/2000 | Spofford | H04L 12/24 709/223 |
| 6,308,205 B1 | * | 10/2001 | Carcerano | H04L 41/0253 709/220 |
| 6,785,579 B2 | * | 8/2004 | Huang | G08C 19/28 341/23 |
| 7,181,487 B1 | * | 2/2007 | Marbach | H04L 41/0654 709/200 |
| 7,870,232 B2 | | 1/2011 | Reckamp et al. | |
| 8,977,968 B2 | * | 3/2015 | Fan | H04W 24/06 455/423 |
| 9,131,266 B2 | * | 9/2015 | Guedalia | H04N 21/43615 |
| 9,495,356 B2 | * | 11/2016 | Farahbod | G06F 17/2725 |
| 9,531,801 B1 | * | 12/2016 | Cantrell | H04L 67/104 |

(Continued)

FOREIGN PATENT DOCUMENTS

EP        1659548 A2    5/2006

OTHER PUBLICATIONS

A. R. Al-Ali and M. Al-Rousan, "Java-based home automation system," in IEEE Transactions on Consumer Electronics, vol. 50, No. 2, pp. 498-504, May 2004. doi: 10.1109/TCE.2004.1309414.*

(Continued)

*Primary Examiner* — Uzma Alam
(74) *Attorney, Agent, or Firm* — Muncy, Geissler, Olds & Lowe, P.C.

(57) ABSTRACT

A mechanism for semantically mapping Internet of Things (IoT) devices maps human-readable information from an Internet of Things (IoT) device to a programmatic interface to enable a user to control the IoT device. The human-readable information includes at least one of text, video, audio, haptics, and images.

30 Claims, 13 Drawing Sheets

(56) References Cited

U.S. PATENT DOCUMENTS

| | | | |
|---|---|---|---|
| 2003/0038730 A1* | 2/2003 | Imafuku | G08C 17/00 340/4.3 |
| 2004/0010630 A1* | 1/2004 | Becher-Wickes | G06Q 30/02 709/250 |
| 2004/0167896 A1 | 8/2004 | Eakin | |
| 2005/0166215 A1* | 7/2005 | Holloway | G06F 9/4443 719/329 |
| 2007/0109589 A1* | 5/2007 | Yokoyama | G06F 17/30893 358/1.15 |
| 2007/0130572 A1* | 6/2007 | Gilbert | G05B 19/0426 719/318 |
| 2007/0157117 A1* | 7/2007 | Viitala | H04M 1/72519 715/810 |
| 2007/0283273 A1* | 12/2007 | Woods | G06F 17/30861 715/738 |
| 2010/0238109 A1* | 9/2010 | Cook | G06F 3/0346 345/156 |
| 2011/0296313 A1* | 12/2011 | Gaxiola | G08C 17/02 715/744 |
| 2012/0109384 A1* | 5/2012 | Stepanian | G06F 21/10 700/275 |
| 2012/0198350 A1* | 8/2012 | Nhiayi | G06F 9/4445 715/740 |
| 2012/0210205 A1* | 8/2012 | Sherwood | G06F 17/30058 715/234 |
| 2012/0210346 A1* | 8/2012 | McCoy | H04N 21/2387 725/25 |
| 2012/0259966 A1 | 10/2012 | Ishii et al. | |
| 2013/0262576 A1 | 10/2013 | Foti | |
| 2013/0290305 A1* | 10/2013 | Feng | G06F 17/30424 707/722 |
| 2014/0055352 A1* | 2/2014 | Davis | G06F 3/017 345/156 |
| 2014/0098247 A1* | 4/2014 | Rao | H04W 4/20 348/207.1 |
| 2014/0104033 A1* | 4/2014 | Griffiths | G05B 19/0426 340/4.3 |
| 2014/0215057 A1* | 7/2014 | Walsh | H04L 43/0823 709/224 |
| 2014/0237498 A1* | 8/2014 | Ivins | G06Q 30/02 725/14 |
| 2014/0258880 A1* | 9/2014 | Holm | H04L 65/40 715/748 |
| 2014/0280838 A1* | 9/2014 | Finn | H04L 49/00 709/223 |
| 2014/0297876 A1* | 10/2014 | Aquilina | G06F 3/0488 709/227 |
| 2014/0304081 A1* | 10/2014 | Jung | G06Q 30/0267 705/14.64 |
| 2014/0304390 A1* | 10/2014 | Bates | H04L 41/147 709/224 |
| 2014/0344402 A1* | 11/2014 | Tivey | G05B 19/4185 709/217 |
| 2015/0309629 A1* | 10/2015 | Amariutei | G06F 3/0412 345/173 |
| 2015/0381776 A1* | 12/2015 | Seed | H04L 67/16 709/203 |

OTHER PUBLICATIONS

International Search Report and Written Opinion—PCT/US2014/044366—ISA/EPO—Sep. 26, 2014.

Li J., et al., "Supporting efficient machine-to-machine communications in the future mobile internet," IEEE Wireless Communications and Networking Conference Workshops (WCNCW), 2012, pp. 181-185.

* cited by examiner

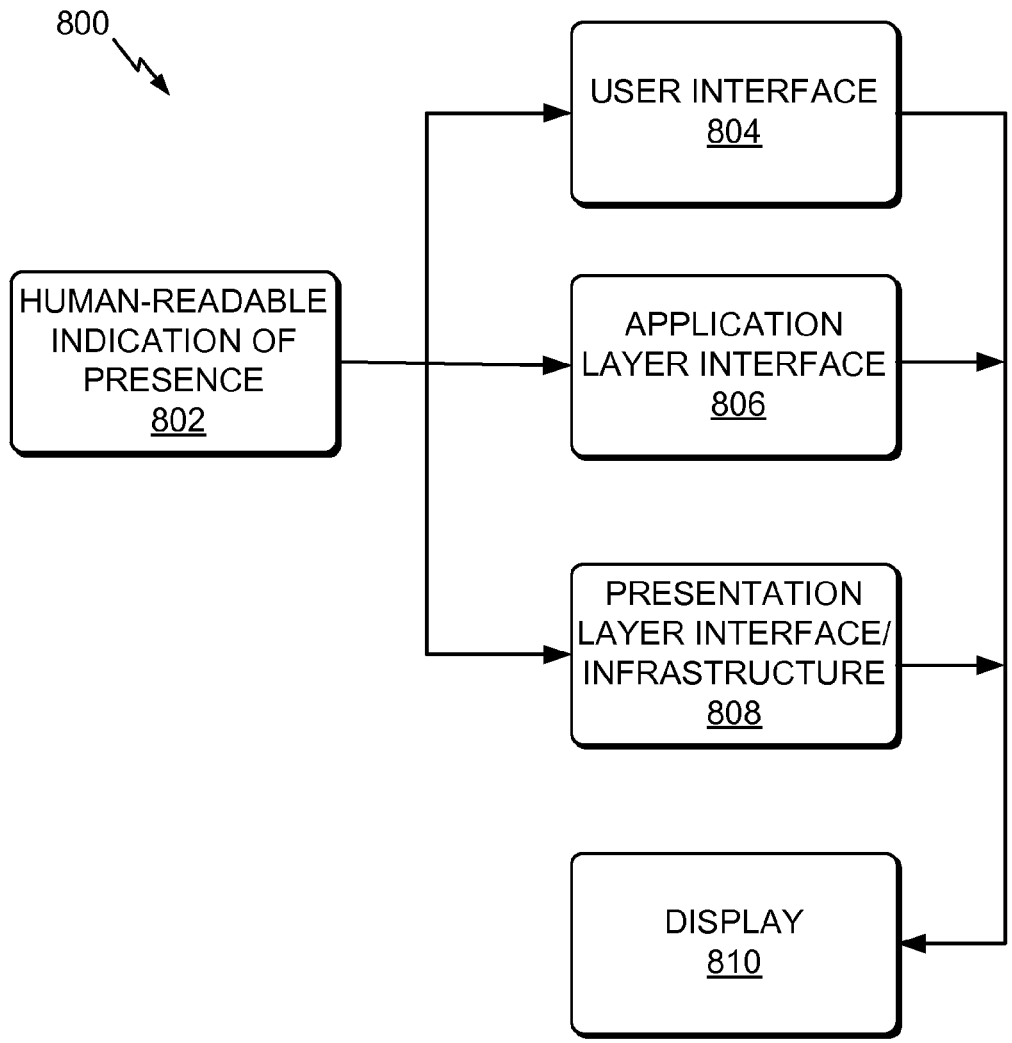
*FIG. 8 – EXAMPLE ARCHITECTURE FOR OBSERVING PRESENCE INDICATIONS AND DISPLAYING SEMANTIC TAGS*

SEMANTIC MAPPINGS FROM HUMAN READABLE MESSAGES TO PROGRAMMATIC INTERFACES

CLAIM OF PRIORITY UNDER 35 U.S.C. §119

The present application for patent claims priority to Provisional Application No. 61/839,822 entitled SEMANTIC MAPPINGS FROM HUMAN READABLE MESSAGES TO M2M INTERFACES, filed Jun. 26, 2013, by the same inventors as the subject application, assigned to the assignee hereof and hereby expressly incorporated by reference herein in its entirety.

FIELD

Implementations relate to semantic mappings of Internet of Things (IoT) devices.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations. However, despite the fact that IoT capable devices can provide substantial real-time information about the environment surrounding a user (e.g., likes, choices, habits, device conditions and usage patterns, etc.), it can be relatively difficult to control different IoT devices from a single application because each IoT device has its own properties and actions that may be unique to the IoT device.

SUMMARY

In general, one implementation of the subject matter disclosed herein is directed to a method, apparatus, and computer-readable storage medium having computer-executable instructions recorded thereon that maps human-readable information from an Internet of Things (IoT) device to a programmatic interface. The human-readable information includes at least one of text, video, audio, haptics, and images.

One or more implementations of the technology described herein include a method of mapping data from an Internet of Things (IoT) device to a programmatic interface. The IoT device is configured to communicate using human-readable information. The method comprises observing, at a computing device, a human-readable indication of a presence of the IoT device, wherein the IoT device includes associated information. In response to observing the human-readable indication of the presence of the IoT device, the method operates by assigning an agreed-upon semantic tag to the associated information and enabling the agreed-upon semantic tag to be used to control the IoT device.

In one or more implementations, observing the human-readable indication of a presence of the IoT device includes observing a presence broadcast by the IoT device, wherein the broadcast is human-readable. Observing the human-readable indication of a presence of the IoT device includes observing the human-readable indication of a presence of the IoT device at a user interface, at an application layer interface, and/or at a presentation layer interface.

In one or more implementations, assigning the agreed-upon semantic tag to the associated information includes assigning the agreed-upon semantic tag to a remotely exposed property of the IoT device. In one or more implementations, assigning the agreed-upon semantic tag to the associated information includes assigning the agreed-upon semantic tag to a remotely exposed property of the IoT device.

In one or more implementations, in response to observing the human-readable indication of the presence of the IoT device, mapping a user interface for the IoT device to a programmatic interface.

In one or more implementations of the technology described herein, an apparatus for mapping data from an Internet of Things (IoT) device to a programmatic interface comprises logic that is configured to observe a human-readable indication of a presence of the IoT device. The logic that is configured to observe a human-readable indication of a presence of the IoT device includes associated information. The apparatus also includes logic that is configured to, in response to observing the human-readable indication of the presence of the IoT device, assign an agreed-upon semantic tag to the associated information. The apparatus also includes logic that is configured to enable the agreed-upon semantic tag to be used to control the IoT device.

In one or more implementations of the technology described herein, a computer-readable storage medium includes data that, when accessed by a machine, cause the machine to perform operations comprising observing, at a computing device, a human-readable indication of a presence of the IoT device, wherein the IoT device includes associated information. In response to observing the human-readable indication of the presence of the IoT device, the method operates by assigning an agreed-upon semantic tag to the associated information and enabling the agreed-upon semantic tag to be used to control the IoT device.

In one or more implementations of the technology described herein, an apparatus for mapping data from an Internet of Things (IoT) device to a programmatic interface comprises means for observing, at a computing device, a human-readable indication of a presence of the IoT device, wherein the IoT device includes associated information. The apparatus also includes means for assigning an agreed-upon semantic tag to the associated information in response to observing the human-readable indication of the presence of the IoT device and means for enabling the agreed-upon semantic tag to be used to control the IoT device.

In one or more implementations, the means for observing the human-readable indication of a presence of the IoT device includes a supervisor device. In one or more implementations, the means for observing the human-readable indication of a presence of the IoT device includes a supervisor device. In one or more implementations, the means for assigning the agreed-upon semantic tag to the associated information includes a semantic mapper. In one or more implementations, the apparatus further comprises means for observing the human-readable indication of a presence of the IoT device at a user interface, an application layer interface, and/or a presentation layer interface.

In one or more implementations, a property associated with the IoT device is a user interface element. The user interface element associated with the IoT device is at least one of a switch and a radio button.

Above is a simplified Summary relating to one or more implementations described herein. As such, the Summary should not be considered an extensive overview relating to all contemplated aspects and/or implementations, nor should the Summary be regarded to identify key or critical elements relating to all contemplated aspects and/or implementations or to delineate the scope associated with any particular aspect and/or implementation. Accordingly, the Summary has the sole purpose of presenting certain concepts relating to one or more aspects and/or implementations relating to the mechanisms disclosed herein in a simplified form to precede the detailed description presented below.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an example Internet of Things (IoT) device in accordance with one or more implementations of the technology described herein, while

FIG. 8 is a high-level block diagram of architecture suitable for implementing mapping data from an Internet of Things (IoT) device to one or more interfaces according to implementations of the technology described herein.

DETAILED DESCRIPTION

Figure 1A:
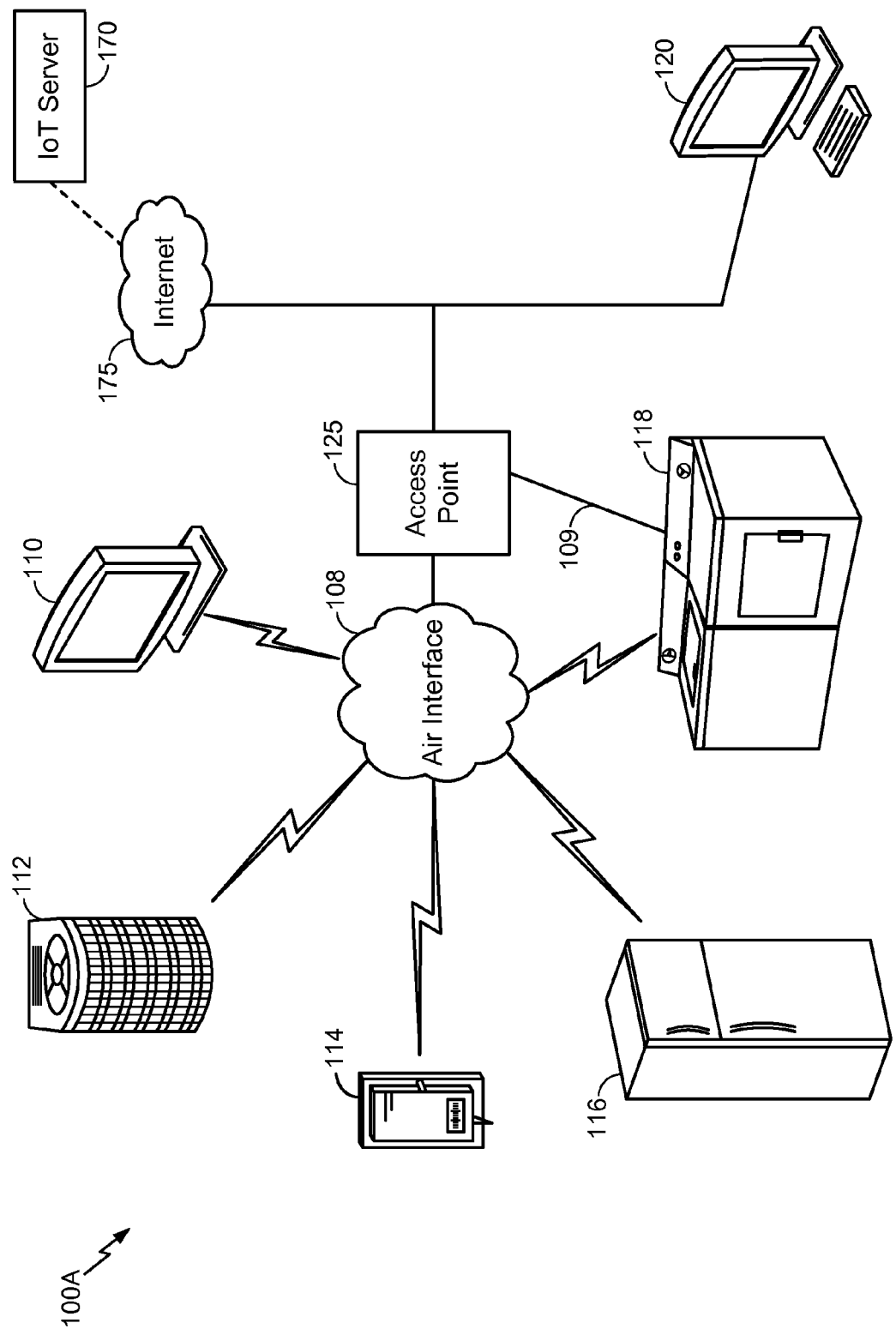
FIG. 1A illustrates a high-level system architecture of a wireless communications system in accordance with one or more implementations of the technology described herein.

In one or more implementations, user-readable text broadcast by an Internet of Things device is mapped to semantic tags or other semantic data that has meaning in an Internet of Things environment. In one or more implementations, a peer-to-peer (P2P) service module allows associated IoT devices to broadcast their presence in a manner that is not meant to be understood by a computer. Instead, the broadcasts are meant to be displayed to the user, understood by the user, and meaningful to the user on the IoT device, for example, in the form of human-readable communications such as text, images, video, audio, haptics, and the like. That is, the computer may not understand what is being broadcast by the IoT devices because the broadcasts do not have message codes or the kind of identification that messages typically utilize in machine-to-machine and/or programmatic communication.

As used herein, the term "semantic tags" is any type of information that can be easily parsed and understood by a computing device. In general, a semantic tag is agreed upon between the communication parties. As an example, the string "CYCLE_DONE" might be a pre-agreed upon semantic tag indicating that a washing machine has finished its cycle. As such, home appliances may be pre-programmed to respond to a message with the specific string of bytes "CYCLE_DONE." However, the string "Your washing machine has finished its cycle" is an English text which, since it has not been predefined and pre-agreed upon, is only comprehensible to a human. A computing device will generally not be programmed to respond to messages with the string "Your washing machine has finished its cycle." Implementations of the technology described herein translate human readable strings into predefined or pre-agreed upon semantic tags.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like.

An IoT device can have a particular set of attributes and/or properties (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network.

IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with one or more implementations of the technology described herein. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed, and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternatively may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the wired connection 109. Alternatively, or additionally, some or all of IoT devices 110-120 may be configured with a communication interface independent of air interface 108 and wired connection 109. For example, if the air interface 108 corresponds to a Wi-Fi interface, certain of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
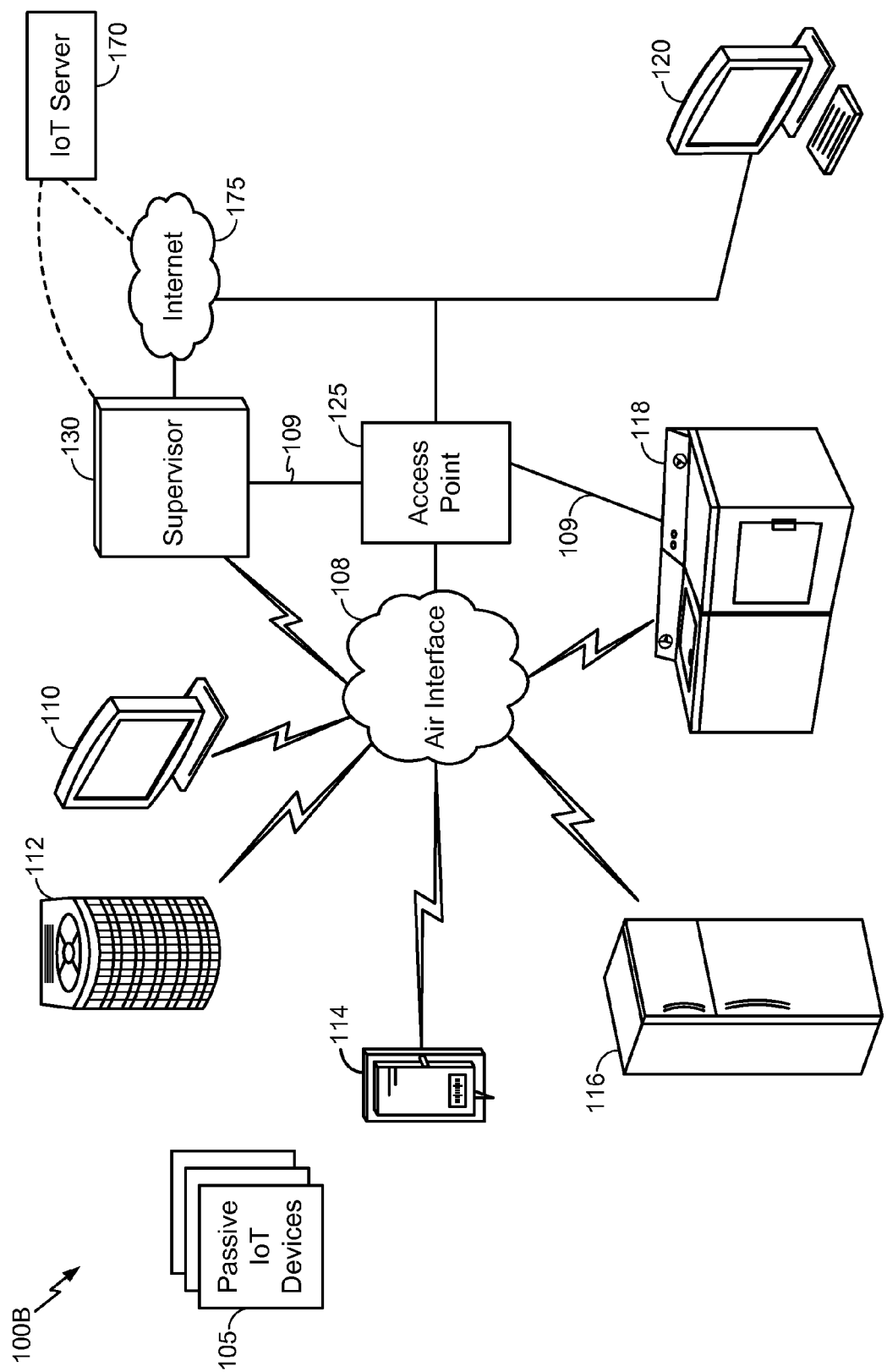
FIG. 1B illustrates a high-level system architecture of a wireless communications system in accordance with alternative implementations of the technology described herein.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one implementation, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120.

The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each has an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RF or barcode communication interfaces, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
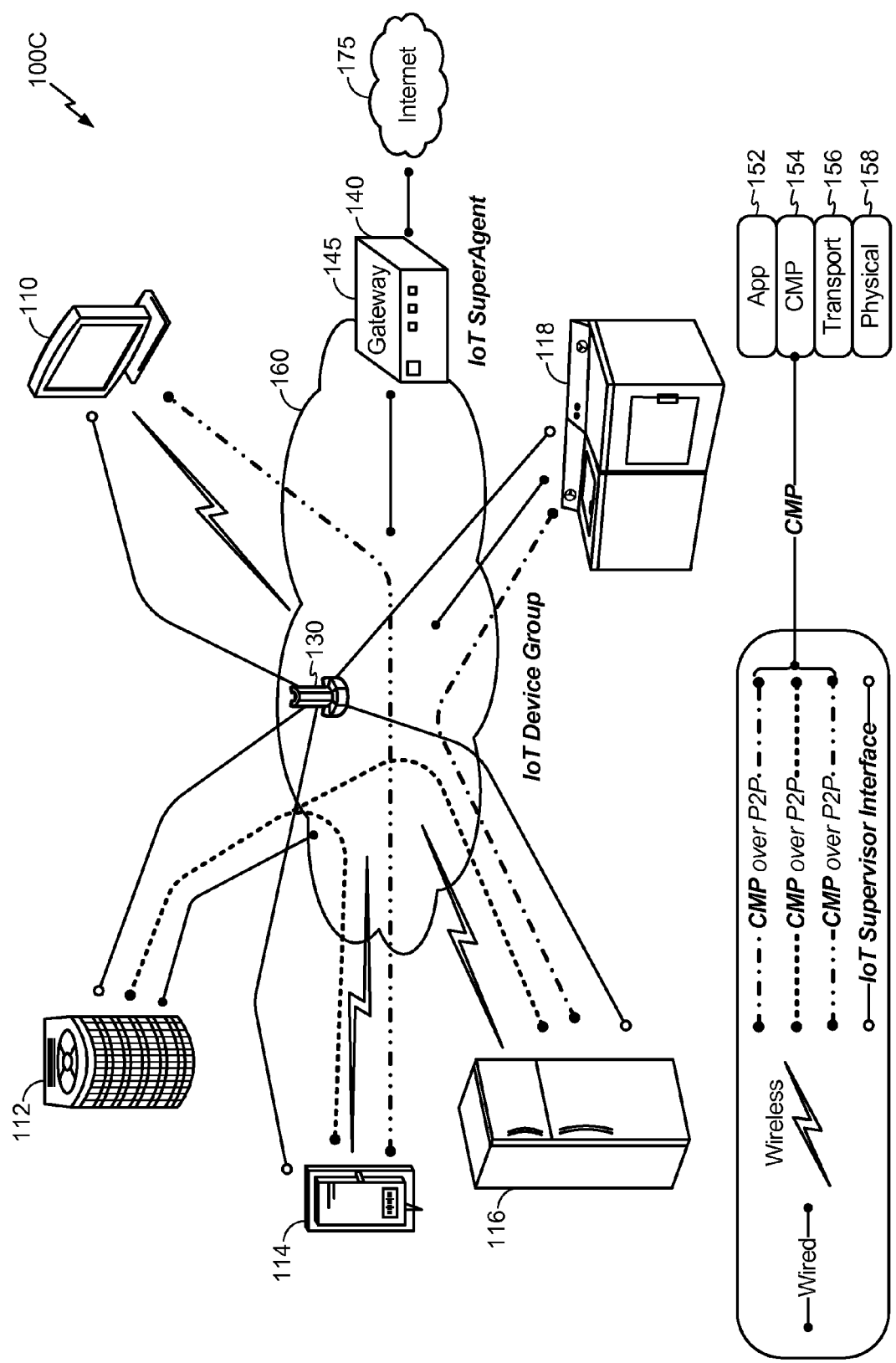
FIG. 1C illustrates a high-level system architecture of a wireless communications system in accordance with still more implementations of the technology described herein.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates example peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
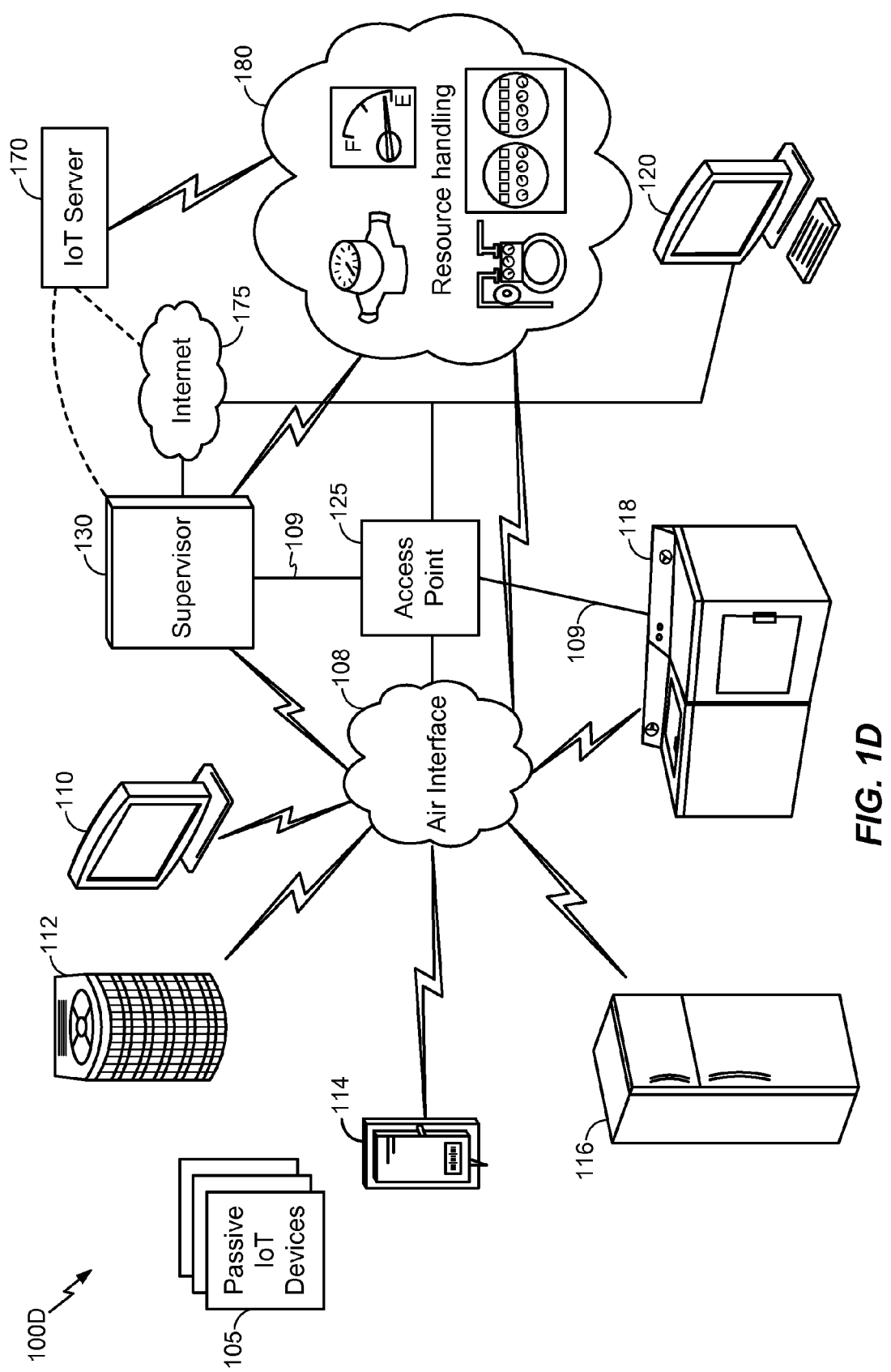
FIG. 1D illustrates a high-level system architecture of a wireless communications system in accordance with one or more implementations of the technology described herein.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIG. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
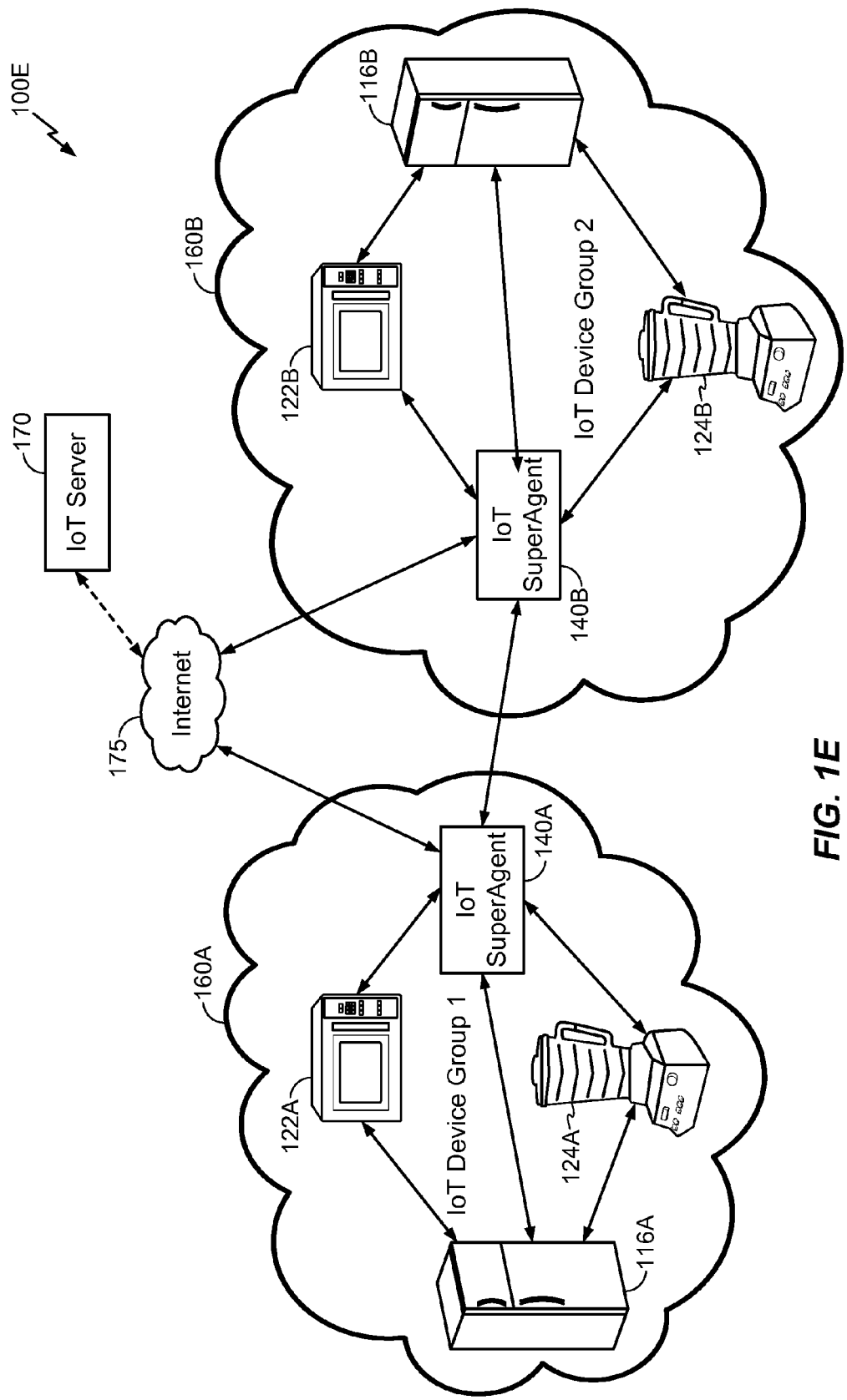
FIG. 1E illustrates a high-level system architecture of a wireless communications system in accordance with one or more implementations of the technology described herein.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIG. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 160A and 160B, those skilled in the art will appreciate that any number of IoT device groups may suitably communicate with each other using IoT SuperAgents.

Figure 2A:
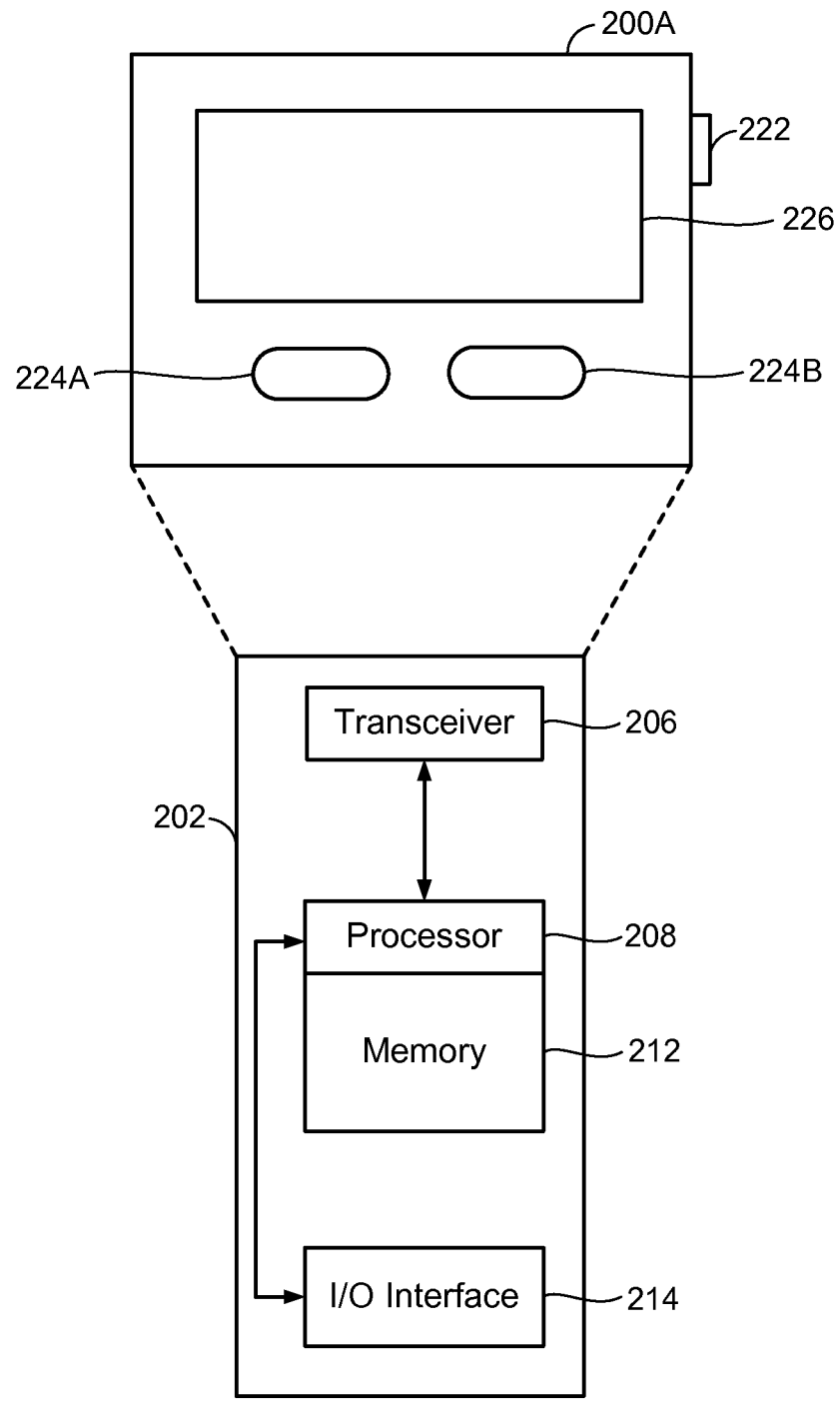

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data, and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
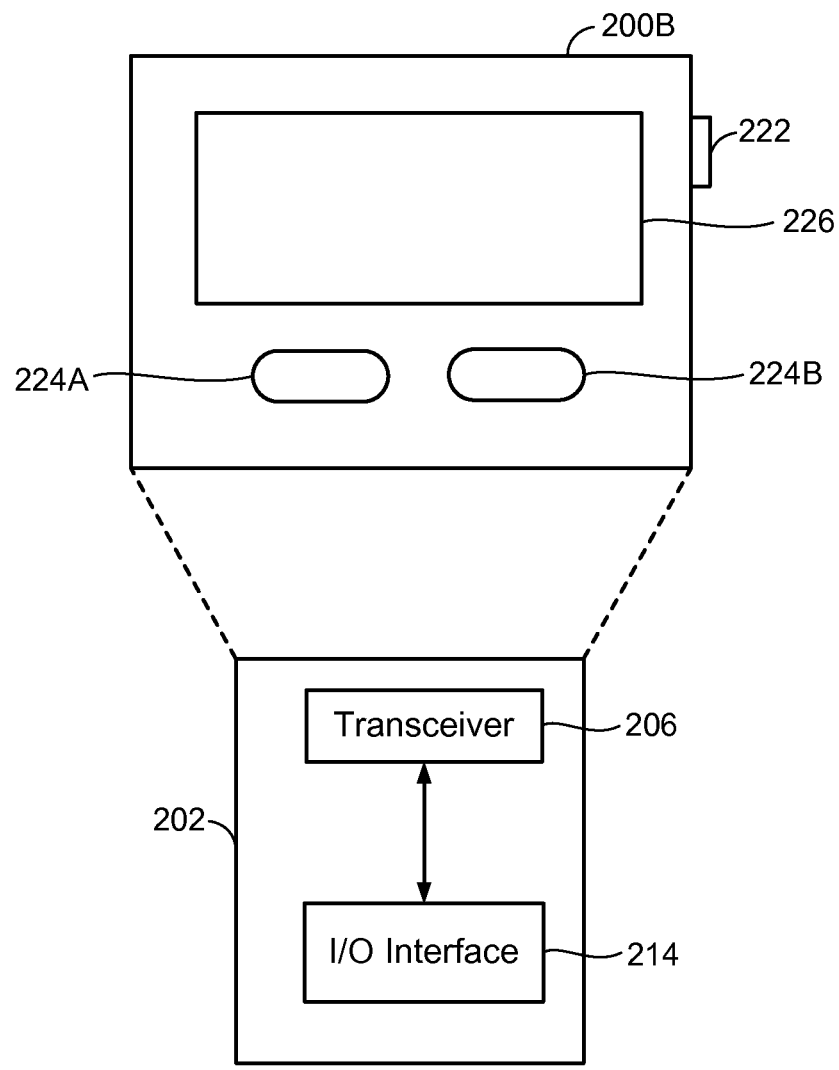
FIG. 2B illustrates an example passive IoT device in accordance with one or more implementations of the technology described herein.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one implementation, the passive IoT device 200A may only include an I/O interface 214 or other suitable mechanism that allows the passive IoT device 200B to be observed, monitored, controlled, managed, or otherwise known within a controlled IoT network. For example, in one implementation, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
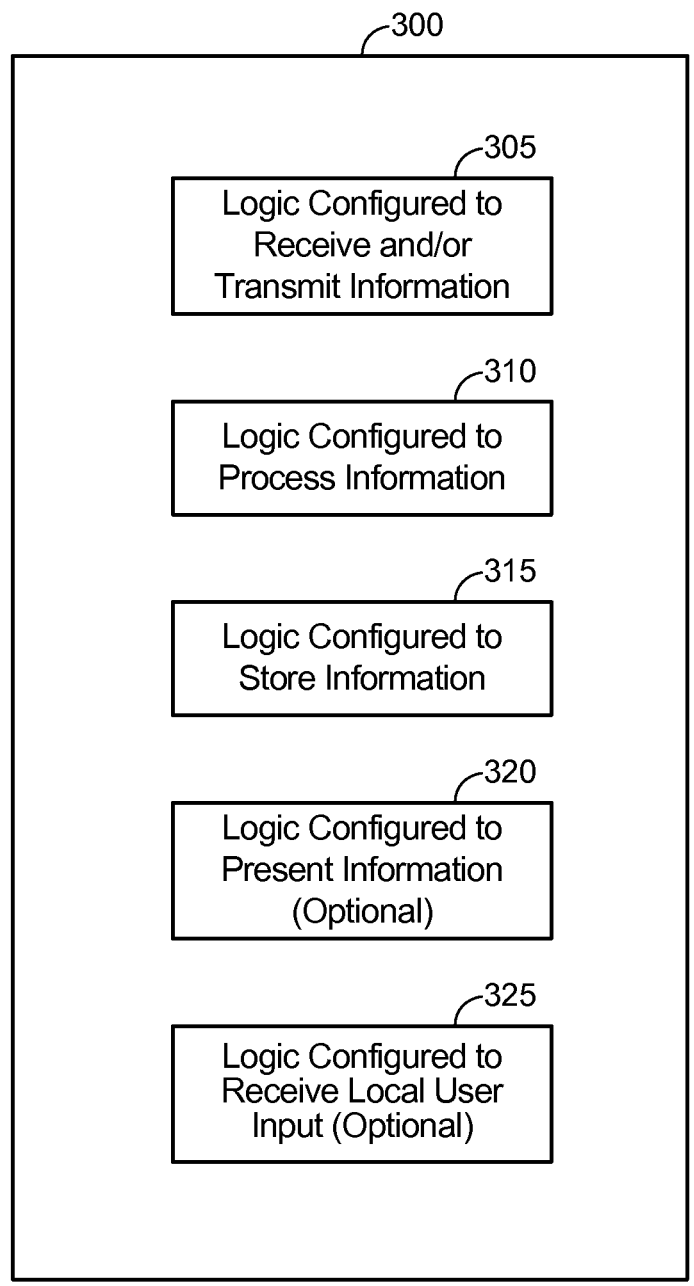
FIG. 3 illustrates a communication device that includes logic configured to perform functionality in accordance with one or more implementations of the technology described herein.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.).

In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol.

In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on.

For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226.

In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc.

In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
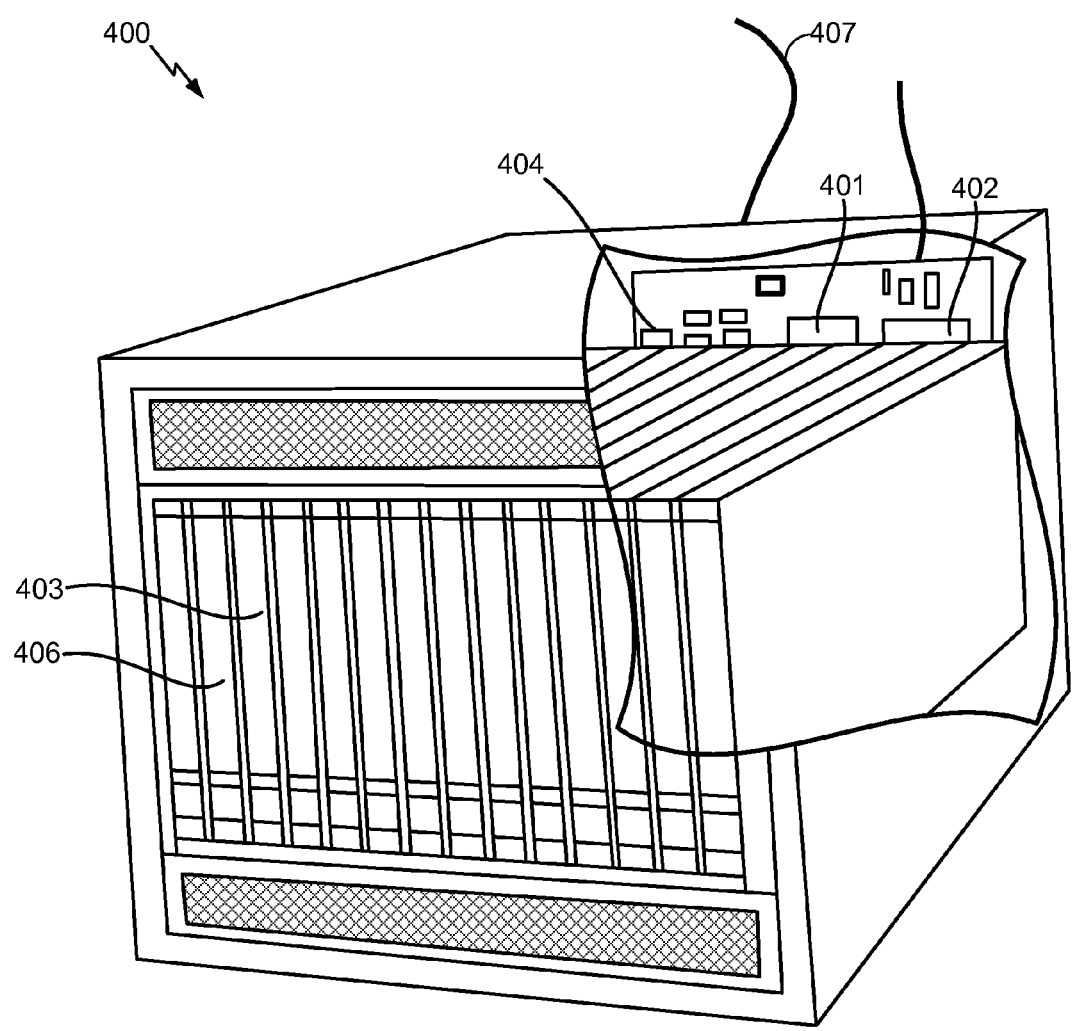
FIG. 4 illustrates an example server in accordance with one or more implementations of the technology described herein.

The various implementations may be implemented on any of a variety of commercially available server devices, such as server 400 illustrated in FIG. 4. In an example, the server 400 may correspond to one example configuration of the IoT server 170 described above. In FIG. 4, the server 400 includes a processor 400 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet.

In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

In an IoT network or environment, enhanced functionality can obtained in certain use cases based on knowledge regarding whether two or more IoT devices are in close physical proximity to each other. As used herein, close physical proximity can correspond to IoT devices being in the same room as each other, or being a few feet away from each other in the same room, or even being a few feet away from each other in different rooms with an intervening wall between the respective IoT devices.

Figure 5:
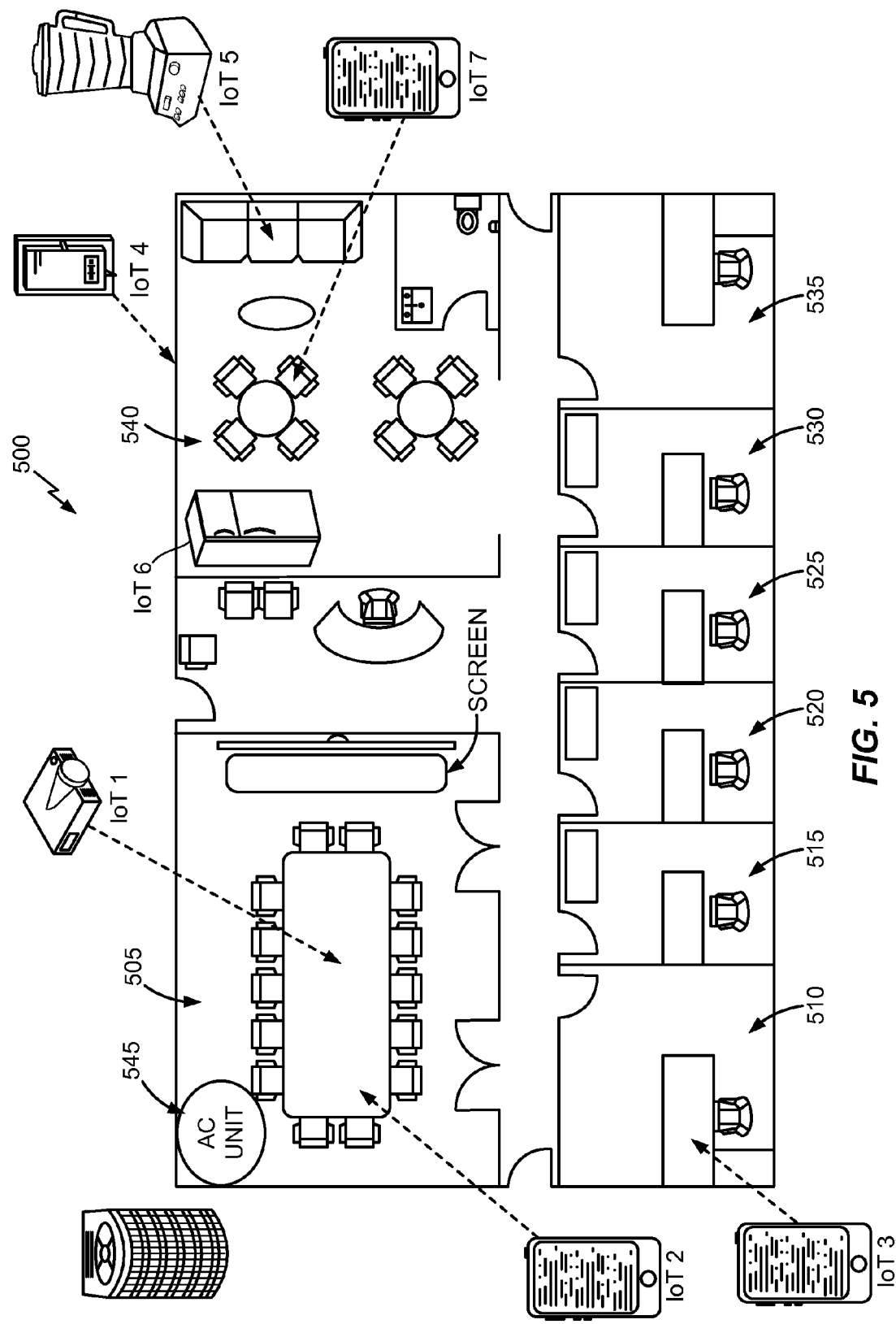
FIG. 5 illustrates an example of an IoT environment in accordance with one or more implementations of the technology described herein.

FIG. 5 illustrates an example of an IoT environment 500 in accordance with an implementation of the technology described herein. In FIG. 5, the IoT environment 500 is an office space with a conference room 505, a plurality of offices 510 through 535 and a kitchen 540. Within the office space, IoT device 1 (e.g., a video projector) and IoT device 2 (e.g., a handset device such as a cell phone or tablet computer) are positioned the conference room 505, and IoT device 3 (e.g., a handset device such as a cell phone or tablet computer) is positioned in office 510. Also, IoT device 4 (e.g., a thermostat), IoT device 5 (e.g., a blender), IoT device 6 (e.g., a refrigerator) and IoT device 7 (e.g., a handset device such as a cell phone or tablet computer being operated by an employee on his/her lunch break) are positioned in the kitchen 540. An air conditioning unit 545 also is positioned in the conference room 505. As will be appreciated, while the IoT environment 500 of FIG. 5 is directed to an office, many other configurations of IoT environments are also possible (e.g., residential homes, retail stores, vehicles, stadiums, etc.).

Conventionally, many devices expose either a graphical user interfaces (GUI) or a programmatic interface. Devices that only expose a GUI are very difficult to program. Each IoT device tends to have its own attributes and/or properties. To illustrate, assume that a user of the computer 120 (depicted in FIG. 1) wishes to control the temperature of air conditioning unit 545 using the computer 120. Depending on the type, model, manufacturer, etc., of the air conditioning unit 545 the temperature control property of the air conditioning unit 545 varies. The computer 120 may not know the different properties for each model of air conditioning unit 545.

In one or more implementations described herein, properties and actions of possible models for the air conditioning unit 545 are mapped from the air conditioning unit 545's exposed graphical user interfaces (GUIs) to a programmatic interface (e.g., and application program interface (API)). In this way, the air conditioning unit 545, no matter the manufacturer, model, etc., can be controlled by the computer 120. In one or more implementations, the mapping is performed at the server 400 depicted in FIG. 4. In alternative implementations, mapping is performed at the computer 120.

Figure 6:
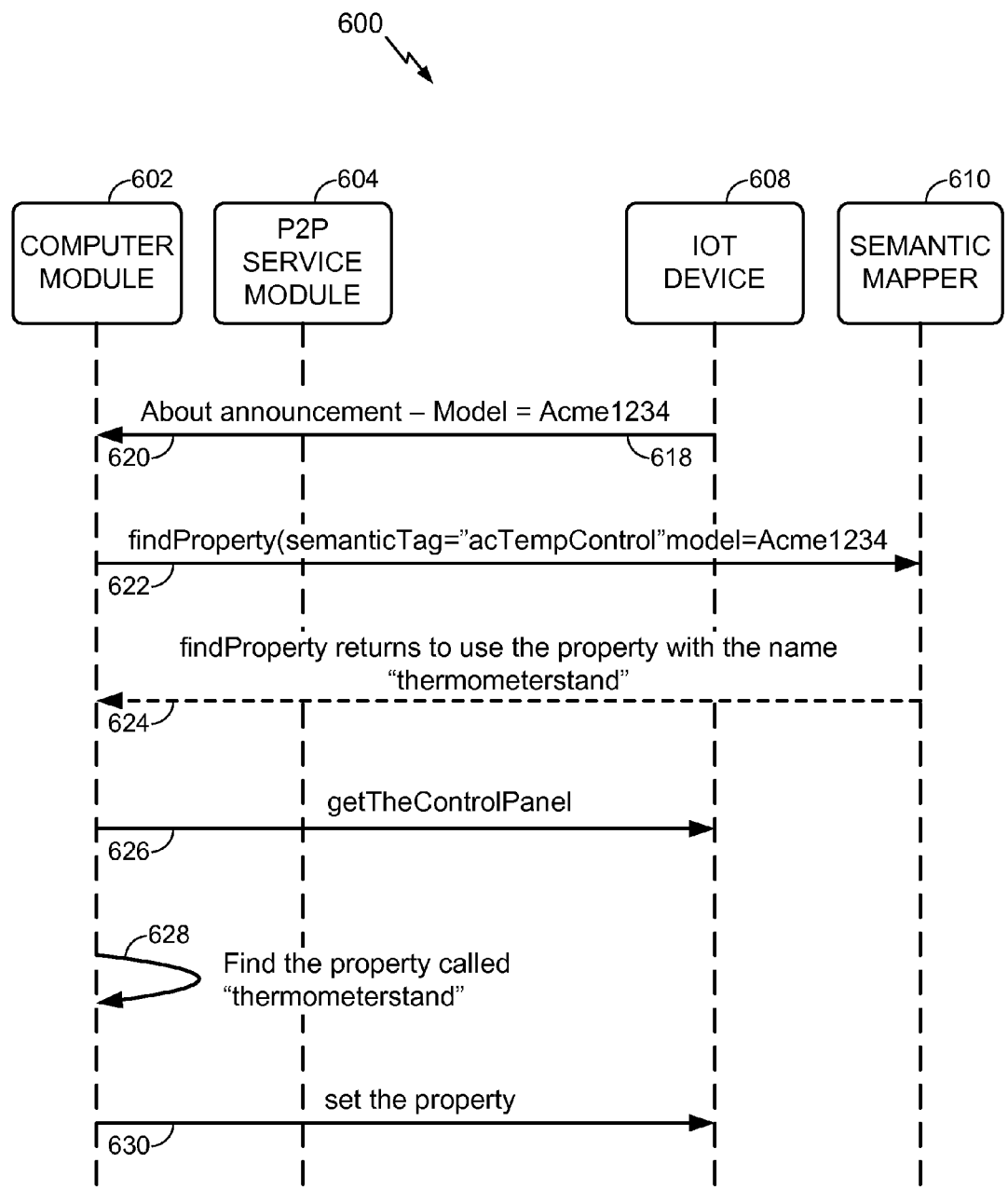
FIG. 6 is a diagram illustrating a message flow for controlling an IoT device according to one or more implementations described herein.

FIG. 6 is a diagram illustrating a message flow 600 for controlling an IoT device according to one or more implementations described herein. The illustrated implementation includes a computer 602, a peer-to-peer (P2P) service module 604, an IoT device 608, and a semantic mapper 610. The message flow 600 is described herein with reference to assigning semantic tags to remotely exposed generic properties (as described above) of the IoT device 608.

In one or more implementations, the computer 602 is similar to computer 120 depicted in FIG. 1. As such, the computer 602 can be a personal computer (PC), a PDA, a smart phone, a tablet, or the like.

In one or more implementations, the P2P service module 604 is a user interface service that allows associated IoT devices to broadcast their presence in a manner that is not meant to be understood by the computer 602. Instead, the broadcasts are meant to be displayed to the user, understood by the user, and meaningful to the user on the IoT device 608, for example, in the form of human-readable communications such as text, images, video, audio, haptics, and the like. That is, the computer 602 does not understand what is being broadcast by the IoT device 608 because the broadcasts do not have message codes or the kind of identification that messages typically utilize in machine-to-machine and/or programmatic communication. In one or more implementations, the P2P service module 604 is a user interface that uses hypertext markup language (HTML) or other user interface technology.

Although shown as a P2P service module, implementations are not so limited. For example, other suitable technologies include a hub-spoke module, a client-server module, or any other module that is capable of communicating between two systems.

In one or more implementations, the P2P service 604 consults a user interface of the IoT device 608 and is programmed to build properties and actions related to the IoT device 608. One property may be a knob on the IoT device 608 (e.g., a temperature knob and/or a timer knob for an oven, a cycle knob for a washing machine or a dishwasher, and the like. One action may be a button (e.g., a radio button) or a switch, which is used to select an action associated with a given property of the IoT device 608.

For example, in implementations in which the IoT device 608 is a washing machine there would be a property by which a user would select which washing cycle to use, e.g., permanent press, cotton, etc. In this example implementation, the user would be presented on the computer 602 with a switch, a radio button, etc., with which the user could select the washing machine cycle. An action associated with the button or switch could then be "start now." The P2P service 604 includes information that informs the computer 602 how to render the properties (i.e., knobs) and actions (i.e., "start now") on the computer 602 for the user to access. Information can include what type of widget to draw, how to label the widget, what color should the widget be, etc. This information allows the semantic mapper 610 to provide a normalized version of valid values for properties in IoT devices, such as the IoT device 608. The normalized version may be the semantic tags.

In one or more implementations, the IoT device 608 can be any suitable IoT device, such as those depicted in FIG. 1. These include, but are not limited to, the television 110, the outdoor air conditioning units 112 and/or 545, the thermostat 114, the refrigerator 116, and the washer and dryer 118.

In one or more implementations, the semantic mapper 610 maps a user interface for one or more IoT devices 608 to a programmatic interface, such as an application programming interface (API). This is accomplished by having the semantic mapper 610 assign semantic tags to remotely exposed generic properties of the IoT device 608. The remotely exposed generic properties may be a generic programmatic interface for setting and/or getting properties of the IoT device 608. Additionally, the semantic mapper 610 provides to the computer 602 a normalized version of valid values for a property for the IoT device 608.

Although illustrated as being separate from the computer 602, the semantic mapper 610 can be a mapping database that resides either locally on the computer 120 or externally in the cloud on a server. In one or more implementations, the semantic mapper 610 can be the computer 120, the server 170, a software library (not shown), or other suitable entity that is capable of mapping properties of IoT devices to a programmatic interface (e.g., an API) so that the semantic mapper 610 can be controlled to interact with the IoT device 608.

To illustrate one or more implementations, assume that the IoT device 608 is an air conditioning unit and an application writer has written an application on the computer 602 that will automatically change the temperature of the IoT device 608. Also assume that the semantic mapper 610 has published documentation that the pre-agreed upon semantic tag for a property for controlling the temperature setting on an air conditioning unit is "org.alljoyn.cpsSemanticTags.acTempControl." The application on the computer 602 sends the air conditioning unit's name to the semantic mapper 610 requesting a mapping for "org.alljoyn.cpsSemanticTags.acTempControl." The response from the semantic mapper 610 informs the application on the computer 602 of a normalized version of the temperature property. For example, the semantic mapper 610 informs the application on the computer 602 to use the property called "thermometerstand." From here on, the application on the computer 602 interacts with the user interface on the IoT device 608 in a standard manner but without needing to display a user interface to the user. The user can view the user interface on the computer 602.

Returning to the message flow 600 in FIG. 6, at a point 618, the IoT device 608 announces its presence in any known manner, such as making its presence discoverable over a suitable discovery protocol. In one or more implementations, the IoT device 608 broadcasts its presence using human-readable communications such as text, images, video, audio, haptics, and the like. The broadcasts are not meant to be understood by the computer 602. Instead, the broadcasts are meant to be displayed to the user, understood by the user, and meaningful to the user on the IoT device 608. That is, the computer 602 does not understand what is being broadcast by the IoT device 608 because the broadcasts do not have message codes or the kind of identification that messages have in typical machine-to-machine and/or programmatic communication.

In the illustrated example, the IoT device 608 broadcasts an "About announcement–Model=Acme1234" text message when the model of the IoT device 608 is an Acme1234 model.

At a point 620, the computer 602 obtains the announcement over the IoT network. In one or more implementations, the computer 602 obtains the broadcast of the announcement using an "About announcement–Model=Acme1234" text message.

At a point 622, the computer 602 requests from the semantic mapper 610 a semantic tag for the temperature property associated with the IoT device 608. In one or more implementations, the computer 620 requests the semantic tag for the temperature property associated with the IoT device 608 by sending over the IoT network a "findProperty (semanticTag"acTempContrormodel"=Acme1234" text message to the semantic mapper 610.

At a point 624, the semantic mapper 610 responds that the temperature property for the Acme1234 air conditioning unit is called "thermometerstand." In one or more implementations, in response to the request for the temperature property the semantic mapper 610 returns a "findProperty returns to use the property with the name 'thermometerstand'" text message to the application on the computer 602. The semantic mapper 610 may look up the mapping in a database and respond over the IoT network.

At a point 626, the application on the computer 602 retrieves the programmatic interface for the IoT device 608 using any suitable network protocol. In one or more implementations, the computer 602 retrieves the programmatic interface for the IoT device 608 by sending a "getTheControlPanel" text message to the IoT device 608.

At a point 628, the application on the computer 602 locates the temperature property on the IoT device 608, by parsing network protocol message, for example. In one or more implementations, the application on the computer 602 locates the temperature property on the IoT device 608 using a "find the property called 'thermometerstand'" text message.

At a point 630, the application on the computer 602 sets the temperature on the IoT device 608, using any suitable network protocol, for example. In one or more implementations, the application on the computer 602 sets the temperature on the IoT device 608 by sending a "set the property" text message to the IoT device 608.

Figure 7:
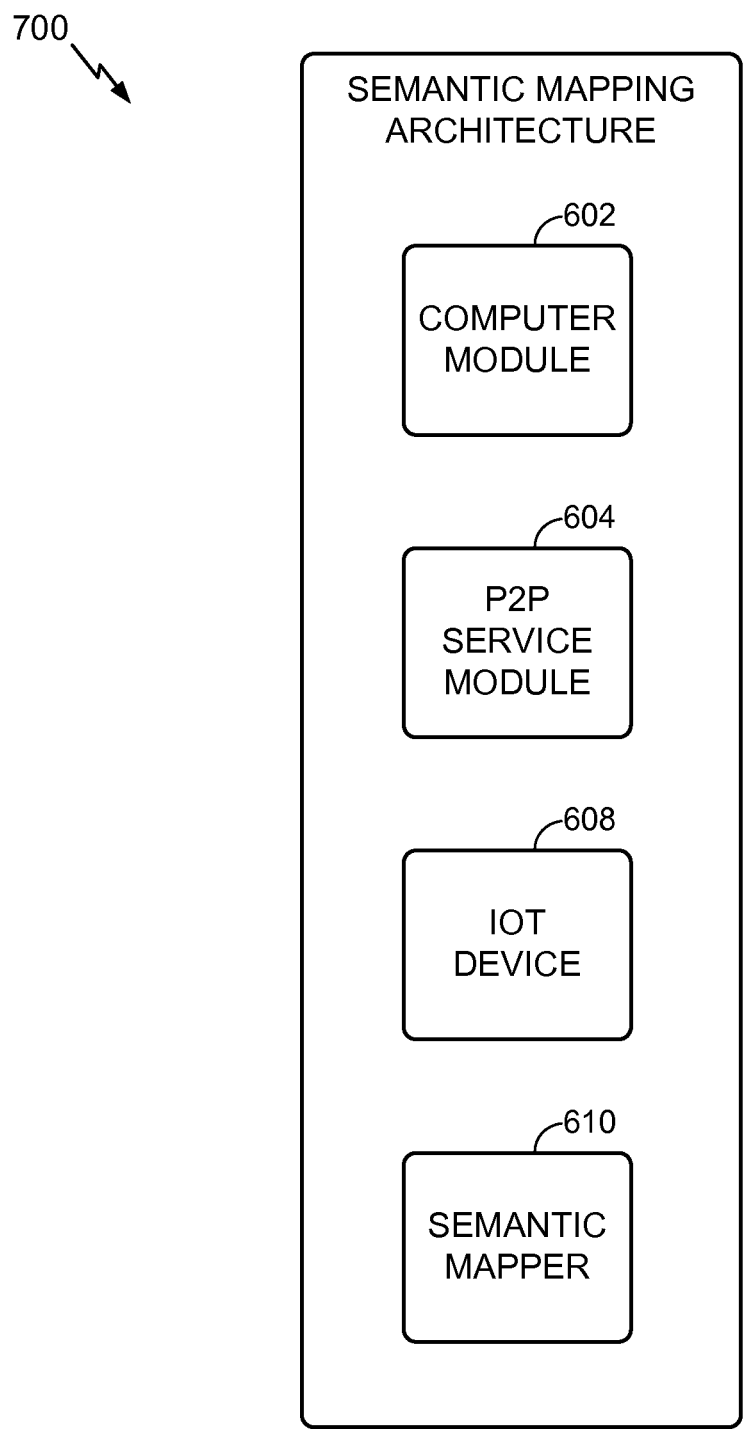
FIG. 7 is a high-level diagram of a system mapper in accordance with one or more implementations of the technology described herein.

FIG. 7 is a high-level diagram of semantic mapping architecture 700 in accordance with one or more implementations of the technology described herein. The illustrated architecture 700 includes the computer 602, the peer-to-peer (P2P) service module 604, the IoT device 608, and the semantic mapper 610. In the illustrated implementation, the computer 602, the peer-to-peer (P2P) service module 604, the IoT device 608, and the semantic mapper 610 appear to be in the same device. However, implementations are not so limited. For example, the computer 602 may be located on one device, the peer-to-peer (P2P) service module 604 and the IoT device 608 may be located on another device, and the semantic mapper 610 may be collocated with the computer 602 or located on a third device.

In one or more implementations, the computer 602 may be any computing device such as a telephone, a tablet computer, a "phablet (phone+tablet)" computer, a smart phone, a laptop computer, and the like. The illustrated computer 602 is capable of communicating with the peer-to-peer (P2P) service module 604, the IoT device 608, and the semantic mapper 610 to implement the message flow 600.

In one or more implementations, the peer-to-peer (P2P) service module 604 may be an off-the-shelf P2P module. The illustrated peer-to-peer (P2P) service module 604 is capable of communicating with the IoT device 608, the semantic mapper 610, and the computer 602.

In one or more implementations, the semantic mapper 610 may be implemented in any suitable table format.

FIG. 8 is a high-level block diagram of architecture 800 suitable for implementing mapping data from an Internet of Things (IoT) device to one or more interfaces according to implementations of the technology described herein. In the illustrated implementations, the architecture 800, which may be one or more computing devices, observes a human-readable indication of a presence of the IoT device (802). The IoT device may include associated information.

The human-readable indication of a presence of the IoT device (802) may be observed by a user interface 804, an application layer interface 806, and/or a presentation layer interface or infrastructure 808.

In response to observing the human-readable indication of a presence of the IoT device (802), the architecture 800 may assign an agreed-upon semantic tag to the associated information and enables pre-agreed upon semantic tag to be used to control the IoT device.

In one or more implementations, the pre-agreed upon semantic tag may be presented on the display 810. For example, if the string "CYCLE_DONE" is a pre-agreed upon semantic tag indicating that a washing machine has finished its cycle, then one or more home appliances (e.g., washing machine, dishwasher, dryer, etc.) may be pre-programmed to display the message with the specific string of bytes "CYCLE_DONE."

Various aspects are disclosed in the following description and related drawings to show specific examples relating to example implementations of semantic mappings from human-readable messages to machine-to-machine interfaces for Internet of Things (IoT) devices. Alternative implementations will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and implementations disclosed herein.

The word "exemplary" is used herein to mean "serving as an example, instance, or illustration." Any implementation described herein as "exemplary" is not necessarily to be construed as preferred or advantageous over other implementations. Likewise, the term "implementations" does not require that all implementations include the discussed feature, advantage, or mode of operation.

The terminology used herein describes particular implementations only and should not be construed to limit any implementations disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps, and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of mapping data from an Internet of Things (IoT) device to a programmatic interface, the method comprising:
    observing, at a computing device, a human-readable indication of an identity of the IoT device;
    determining a property of the IoT device to be controlled;
    transmitting, from the computing device to a server, a request for a semantic tag associated with the property to be controlled, wherein the request includes the property of the IoT device and the identity of the IoT device;
    receiving from the server, at the computing device, the semantic tag associated with the property; and
    transmitting, from the computing device to the IoT device, a command to set the property of the IoT device, wherein the command includes the semantic tag.

2. The method of claim 1, wherein observing the human-readable indication of the presence of the IoT device includes observing a presence broadcast by the IoT device, wherein the presence broadcast is human-readable.

3. The method of claim 1, wherein assigning the agreed-upon semantic tag to the associated information includes assigning the agreed-upon semantic tag to a remotely exposed property of the IoT device.

4. The method of claim 1, further comprising, in response to observing the human-readable indication of the presence of the IoT device, mapping a user interface for the IoT device to the programmatic interface.

5. The method of claim 1, wherein observing the human-readable indication of the presence of the IoT device includes observing the human-readable indication of the presence of the IoT device at a user interface.

6. The method of claim 5, wherein a property associated with the IoT device is a user interface element.

7. The method of claim 6, wherein the user interface element associated with the IoT device is at least one of a switch and a radio button.

8. The method of claim 1, wherein observing the human-readable indication of the presence of the IoT device includes observing the human-readable indication of the presence of the IoT device at an application layer interface.

9. The method of claim 1, wherein observing the human-readable indication of the presence of the IoT device includes observing the human-readable indication of the presence of the IoT device at a presentation layer interface.

10. The method of claim 1, wherein the human-readable indication includes at least one of text, video, audio, haptics, and images.

11. An apparatus for mapping data from an Internet of Things (IoT) device to a programmatic interface, the apparatus comprising a transceiver, a processor, a memory, and/or an interface configured to:
    observe, at the apparatus, a human-readable indication of an identity of the IoT device;
    determine a property of the IoT device to be controlled;
    transmit, from the apparatus to a server, a request for a semantic tag associated with the property to be controlled, wherein the request includes the property of the IoT device and the identity of the IoT device;
    receive from the server, at the apparatus, the semantic tag associated with the property; and
    transmit, from the apparatus to the IoT device, a command to set the property of the IoT device, wherein the command includes the semantic tag.

12. The apparatus of claim 11, wherein the transceiver, the processor, the memory, and/or the interface are configured to observe the human-readable indication of the presence of the IoT device by observing a presence broadcast by the IoT device, wherein the presence broadcast is human-readable.

13. The apparatus of claim 11, wherein the transceiver, the processor, the memory, and/or the interface are configured to assign the agreed-upon semantic tag to the associated information by assigning the agreed-upon semantic tag to a remotely exposed property of the IoT device.

14. The apparatus of claim 11, wherein the transceiver, the processor, the memory, and/or the interface are further configured map a user interface for the IoT device to the programmatic interface.

15. The apparatus of claim 11, wherein the transceiver, the processor, the memory, and/or the interface are configured to observe the human-readable indication of the presence of the IoT device by observing the human-readable indication of the presence of the IoT device at a user interface.

16. The apparatus of claim 15, wherein a property associated with the IoT device is a user interface element.

17. The apparatus of claim 16, wherein the user interface element associated with the IoT device is at least one of a switch and a radio button.

18. The apparatus of claim 11, wherein the transceiver, the processor, the memory, and/or the interface are configured to observe the human-readable indication of the presence of the IoT device by observing the human-readable indication of the presence of the IoT device at an application layer interface.

19. The apparatus of claim 11, wherein the transceiver, the processor, the memory, and/or the interface are configured to observe the human-readable indication of the presence of the IoT device by observing the human-readable indication of the presence of the IoT device at a presentation layer interface.

20. The apparatus of claim 11, wherein the human-readable indication includes at least one of text, video, audio, haptics, and images.

21. A non-transitory computer-readable storage medium including data that, when accessed by a machine, cause the machine to perform operations comprising:
    observing, at a computing device, a human-readable indication of an identity of the IoT device;

determining a property of the IoT device to be controlled;

transmitting, from the computing device to a server, a request for a semantic tag associated with the property to be controlled, wherein the request includes the property of the IoT device and the identity of the IoT device;

receiving from the server, at the computing device, the semantic tag associated with the property; and transmitting, from the computing device to the IoT device, a command to set the property of the IoT device, wherein the command includes the semantic tag.

22. The non-transitory computer-readable storage medium of claim 21, further comprising data that, when accessed by the machine, cause the machine to perform operations comprising observing a presence broadcast by the IoT device, wherein the presence broadcast is human-readable.

23. The non-transitory computer-readable storage medium of claim 21, further comprising data that, when accessed by the machine, cause the machine to perform operations comprising assigning the agreed-upon semantic tag to a remotely exposed property of the IoT device.

24. The non-transitory computer-readable storage medium of claim 21, further comprising data that, when accessed by the machine, cause the machine to perform operations comprising, in response to observing the human-readable indication of the presence of the IoT device, mapping a user interface for the IoT device to a programmatic interface.

25. The non-transitory computer-readable storage medium of claim 21, further comprising data that, when accessed by the machine, cause the machine to perform operations comprising observing the human-readable indication of the presence of the IoT device includes observing the human-readable indication of the presence of the IoT device at at least one of a user interface, application layer interface, or a presentation layer interface.

26. The non-transitory computer-readable storage medium of claim 21, wherein the human-readable indication includes at least one of text, video, audio, haptics, and images.

27. An apparatus for mapping data from an Internet of Things (IoT) device to a programmatic interface, the apparatus comprising:

means for observing, at a computing device, a human-readable indication of an identity of the IoT device;

means for determining a property of the IoT device to be controlled;

means for transmitting, from the apparatus to a server, a request for a semantic tag associated with the property to be controlled, wherein the request includes the property of the IoT device and the identity of the IoT device;

means for receiving from the server, at the apparatus, the semantic tag associated with the property; and means for transmitting, from the computing device to the IoT device, a command to set the property of the IoT device, wherein the command includes the semantic tag.

28. The apparatus of claim 27, wherein the means for observing the human-readable indication of the presence of the IoT device includes a supervisor device.

29. The apparatus of claim 27, wherein the means for assigning the agreed-upon semantic tag to the associated information includes a semantic mapper.

30. The apparatus of claim 27, further comprising means for observing the human-readable indication of the presence of the IoT device at at least one of a user interface, application layer interface, or a presentation layer interface.

* * * * *